(12) United States Patent
Vangestad et al.

(10) Patent No.: US 8,514,780 B2
(45) Date of Patent: Aug. 20, 2013

(54) UNIFIED MULTI TECHNOLOGY SWITCHBOARD SYSTEM

(75) Inventors: Helge Vangestad, Oslo (NO); Jo Monsen, Oslo (NO)

(73) Assignee: Zisson AS, Oslo (NO)

( * ) Notice: Subject to any disclaimer, the term of this patent is extended or adjusted under 35 U.S.C. 154(b) by 358 days.

(21) Appl. No.: 12/812,873

(22) PCT Filed: Jan. 16, 2009

(86) PCT No.: PCT/IB2009/005016
§ 371 (c)(1),
(2), (4) Date: Dec. 13, 2010

(87) PCT Pub. No.: WO2009/090560
PCT Pub. Date: Jul. 23, 2009

(65) Prior Publication Data
US 2011/0122814 A1    May 26, 2011

(51) Int. Cl.
*H04W 4/00* (2009.01)
(52) U.S. Cl.
USPC .......................................................... 370/328
(58) Field of Classification Search
None
See application file for complete search history.

(56) References Cited

U.S. PATENT DOCUMENTS

| | | | |
|---|---|---|---|
| 6,076,093 A | 6/2000 | Pickering | |
| 2002/0164006 A1* | 11/2002 | Weiss | 379/201.01 |
| 2003/0215080 A1 | 11/2003 | Wengrovitz | |
| 2005/0213609 A1 | 9/2005 | Brusilovsky et al. | |
| 2006/0101098 A1 | 5/2006 | Morgan et al. | |
| 2007/0130260 A1* | 6/2007 | Weintraub et al. | 709/204 |
| 2007/0270138 A1* | 11/2007 | Bhakta et al. | 455/418 |
| 2007/0280464 A1* | 12/2007 | Hughes et al. | 379/205.01 |
| 2008/0049738 A1* | 2/2008 | Joung et al. | 370/356 |

FOREIGN PATENT DOCUMENTS

| | | |
|---|---|---|
| EP | 0980175 | 2/2000 |
| EP | 1363444 | 11/2003 |
| EP | 1551164 | 7/2005 |
| WO | 02/19675 | 3/2002 |

OTHER PUBLICATIONS

International Search Report issued for PCT/IB2009/005016.

* cited by examiner

*Primary Examiner* — John Blanton
(74) *Attorney, Agent, or Firm* — Fox Rothschild, LLP; Gerard Norton; Robert J. Sacco

(57) ABSTRACT

A unified switchboard systems is capable of simultaneously interacting with different available voice communications systems to provide PABX features across these systems. The unified switchboard includes networking hardware to provide data communications over a network, a web server to provide a user interface to a user terminal connected to the network, a plurality of VoIP switches, a database and related database application program to store user-specific data and related call data, and a web-service application to obtain call status information from carriers of non-VoIP calls. Call commands originating from the user terminal propagate from the web server into the database and hence to the VoIP switches. Call-related data propagates from the VoIP switches and the web-service service into the database, which may then be used to update the webpage for the user terminal hosted by the web server.

10 Claims, 9 Drawing Sheets

Fig. 1A

UNIFIED MULTI TECHNOLOGY SWITCHBOARD SYSTEM

CROSS-REFERENCE TO RELATED APPLICATION

This application is a 371 National Phase Application of PCT/IB09/005,016 filed Jan. 16, 2009, which claims the benefit of to U.S. Application Ser. Nos. 60/011,684 filed Jan. 18, 2008 and 60/011,683 filed Jan. 18, 2008, the disclosures of which are incorporated herein by reference.

FIELD OF THE INVENTION

The present invention relates generally to telephone switchboards. More particularly, the present invention discloses a telephone switchboard that is capable of integrating with multiple different communications technologies.

BACKGROUND OF THE INVENTION

Many organizations today employ various types of voice communications systems, such as PSTN (public switched telephone network) in the form of analog fixed telecom, digital fixed telecom and more recently Voice over IP (VoIP), Mobile VoIP (MVoIP), GSM (Global System for Mobile communications), UMTS (Universal Mobile Telecommunications System), etc.

Employees and other users of voice communications systems may use different terminals to access the various systems. Some terminals offer multi-mode voice communications system access and may be used to access services on more than one voice communication system concurrently. For example, some mobile devices support both mobile VoIP and GSM services, with each service exposed as a different telephone number.

For organizations utilizing several types of voice communication systems, it would be desirable to have access to an integrated switchboard system that provides information about all types of voice communications devices, regardless of their underlying communications protocols.

SUMMARY OF THE INVENTION

Various embodiment unified switchboard systems are capable of simultaneously interacting with different available voice communications systems. The unified switchboard systems provide those features normally available in a PABX (Private Automatic Branch exchange), such as the call, queuing, transfer, hold, and conference features.

Other embodiment switchboard systems are able to detect in real time whether or not an individual employee or user is engaged in a call, regardless of which voice communication system is currently being used for the call. Embodiment switchboard systems are capable of interfacing with various voice communications systems. Further, the switchboard systems may show the call status of each individual employee or user regardless of the communications system he or she is currently using. Preferred embodiments show this information in a user-friendly manner that is intuitive and easy to understand. Preferred embodiments provide a Graphical User Interface (GUI) with the required user interaction to perform common switchboard tasks, such as call transfer, call hold, conference calling, etc.

Other embodiments provide a technology-independent user interface that is available across different platforms, such as Linux- or Windows-based operating systems, stationary, mobile and handheld devices, including mobile cellular phones.

Various embodiments further allow the display of real-time or near real-time call status data from available voice communications systems. Particular embodiments allow for easy integration and exchange of data to facilitate directory searches, telephone directory services, internal office systems, etc.

In specific embodiments, standard server components are used to provide a unified switchboard system. The components include networking hardware to provide data communications over a network, a web server to provide a user interface to a user terminal connected to the network, a plurality of VoIP switches, a database and related database application program to store user-specific data and related call data, and a web-service application to obtain call status information from carriers of non-VoIP calls. Call commands originating from the user terminal propagate from the web server into the database and thence to the VoIP switches. Call-related data propagates from the VoIP switches and the web-service into the database, which may then be used to update the webpage for the user terminal hosted by the web server.

BRIEF DESCRIPTION OF THE DRAWINGS

FIGS. 1A and 1B are screen shots of different embodiment user interfaces for a multi-technology switch board system.

DETAILED DESCRIPTION

An embodiment unified multi-technology switchboard system is capable of simultaneously interacting with different available voice communications systems, such as PSTN (public switched telephone network) in the form of analog fixed telecom, digital fixed telecom, and more recently Voice over IP (VoIP), Mobile VoIP (MVoIP), GSM (Global System for Mobile communications), UMTS (Universal Mobile Telecommunications System), etc., to provide a switchboard operator and other users with relevant information and features normally found in standard switchboard systems, e.g. PBX.

Figure 1A:
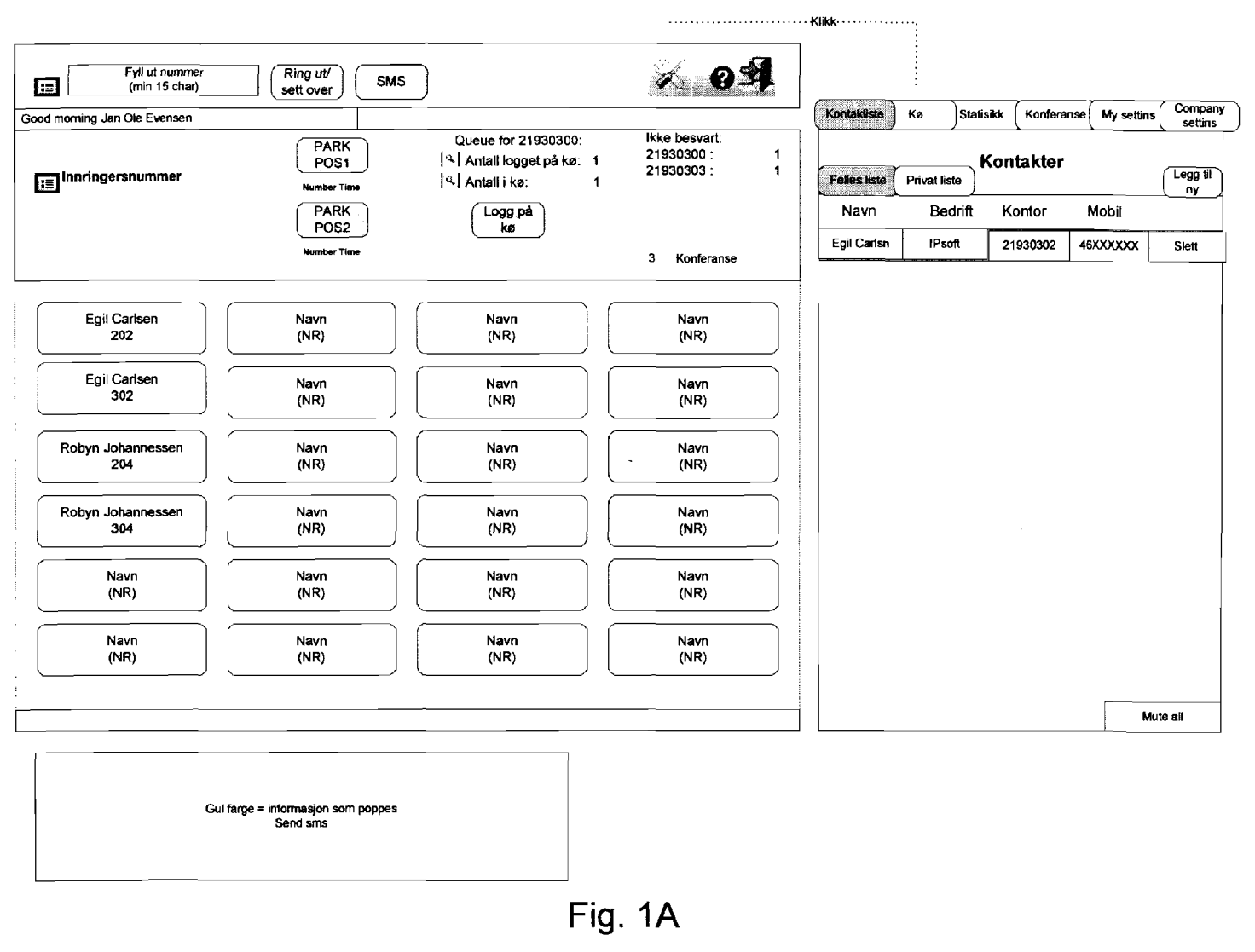
Figure 1B:
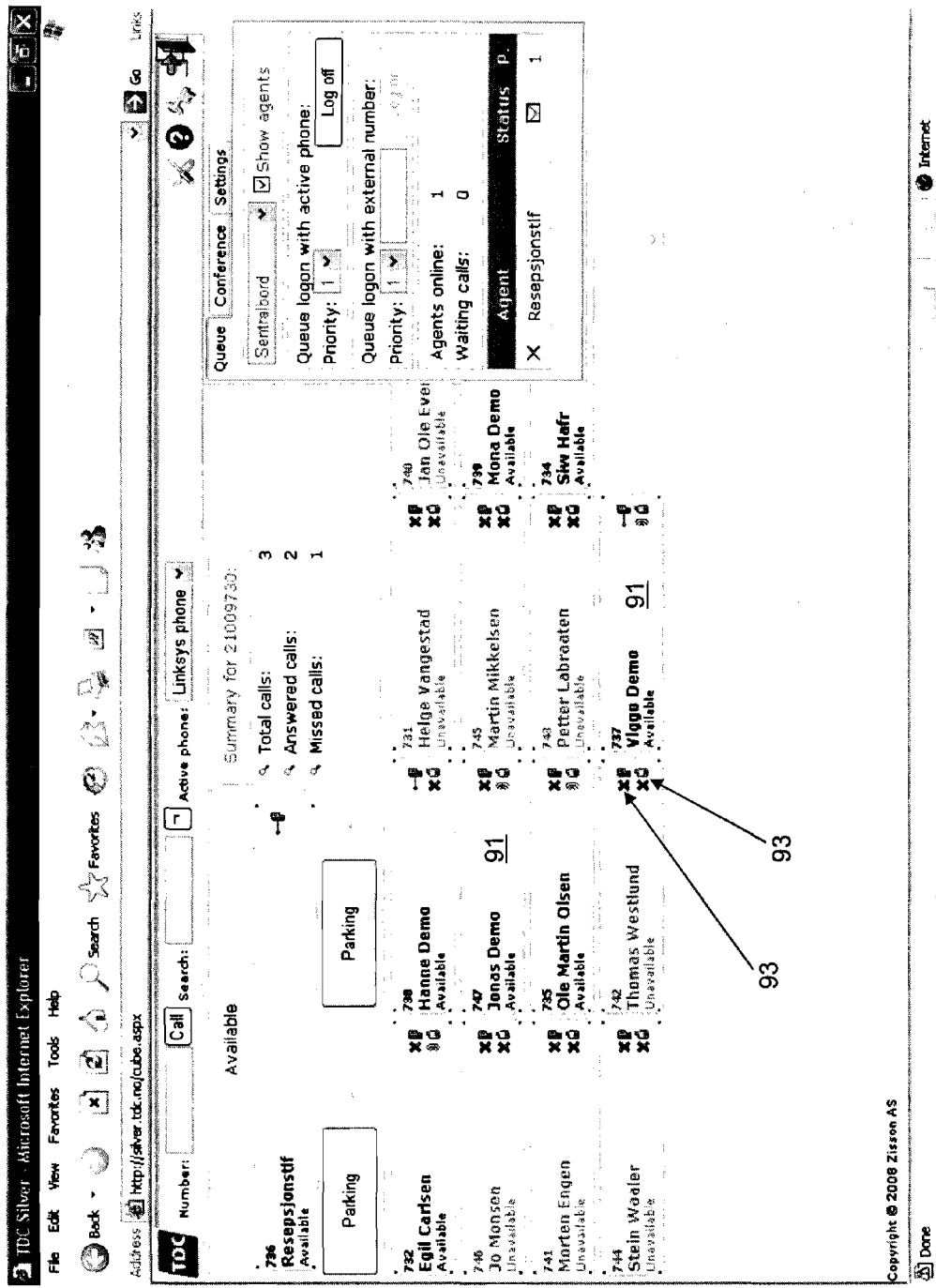
Figure 2:
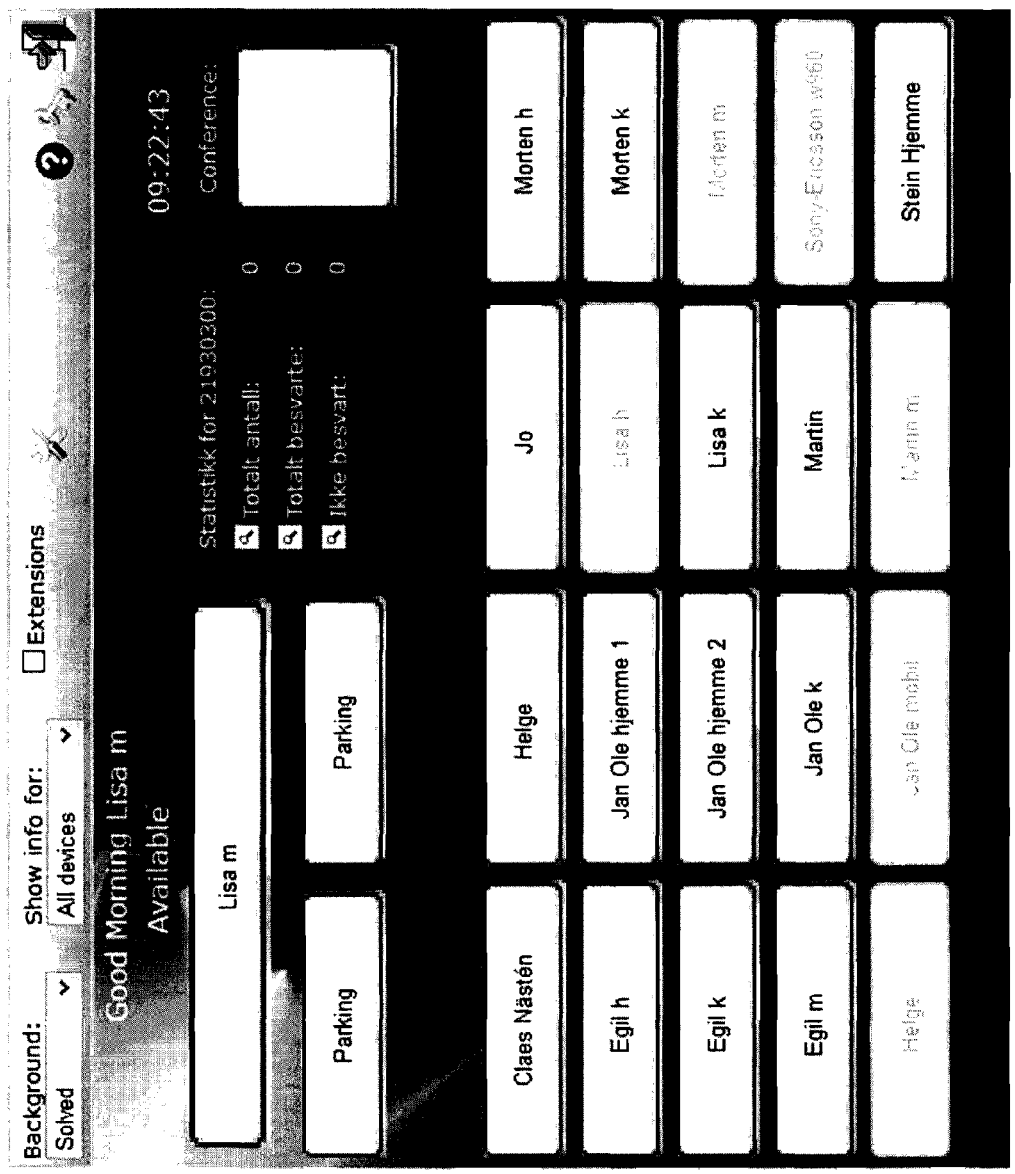
FIG. 2 is a screen shot of an embodiment switchboard system interface used by a switchboard operator to perform common tasks.
Figure 3:
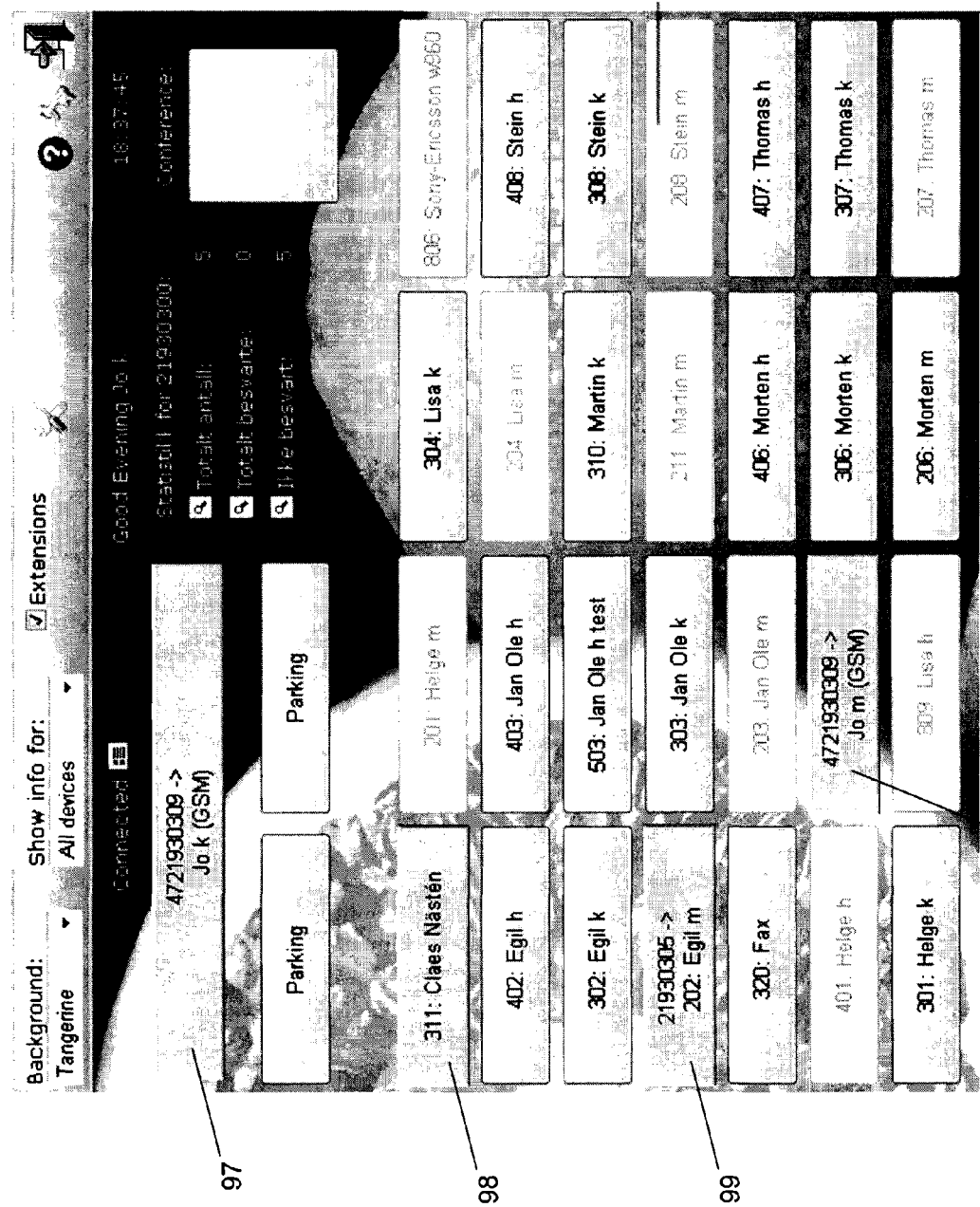
FIG. 3 is a screen shot of an embodiment user interface showing employees engaged in various types of calls.

Screen shots of a graphical user interface presented by embodiment multi-technology switch board systems with extended functionalities are shown in FIGS. 1-3. In FIG. 3, the switchboard system presents a simple user interface, such as on the terminal of an end-user, that indicates that an employee is engaged in a Mobil IP call 99, an employee is engaged in a fixed IP call 98, and an employee is engaged in a GSM call 97. With reference to an alternative embodiment user interface shown in FIG. 1B, each button 91 with a name on it represents a person (i.e., a user whose communications equipment is being monitored by the switch board system), and the user-specific data (name, telephone number, etc.) for this person may be stored in a database or the like. Each button 91 may include icons, such as the two small icons 93 on the right side of the button 91. By way of specific example, one of the icons 93 says "IP", while the other icon 93 is shaped like a cellular phone. The "IP" icon 93 indicates the availability of a user via a VoIP connection, while the cellular icon 93 indicates the availability of the user on a GSM network. An "X" preceding the icon 93 indicates that the user is not available on that respective communications network, whereas the absence of such an "X" indicates availability of the user on that communications network.

If a user is engaged in a phone call, regardless of the communications system used (such as VoIP, GSM, etc.), the background color of the button 91 may change color. In addition, the color of the icon 93 indicative of the communications system in use may also change. For example, if the user is engaged in a VoIP call, then the "IP" icon 93 may change color, whereas if the user is engaged in a cellular call then the cellular icon 93 may change color. As a result, a user of the switchboard terminal can easily see if a person is engaged and which network the person is using. Finally, if a person is not available on any network then the entire button 91 may be dimmed. In this scenario it would typically not make any sense to try to transfer the call.

Figure 4:
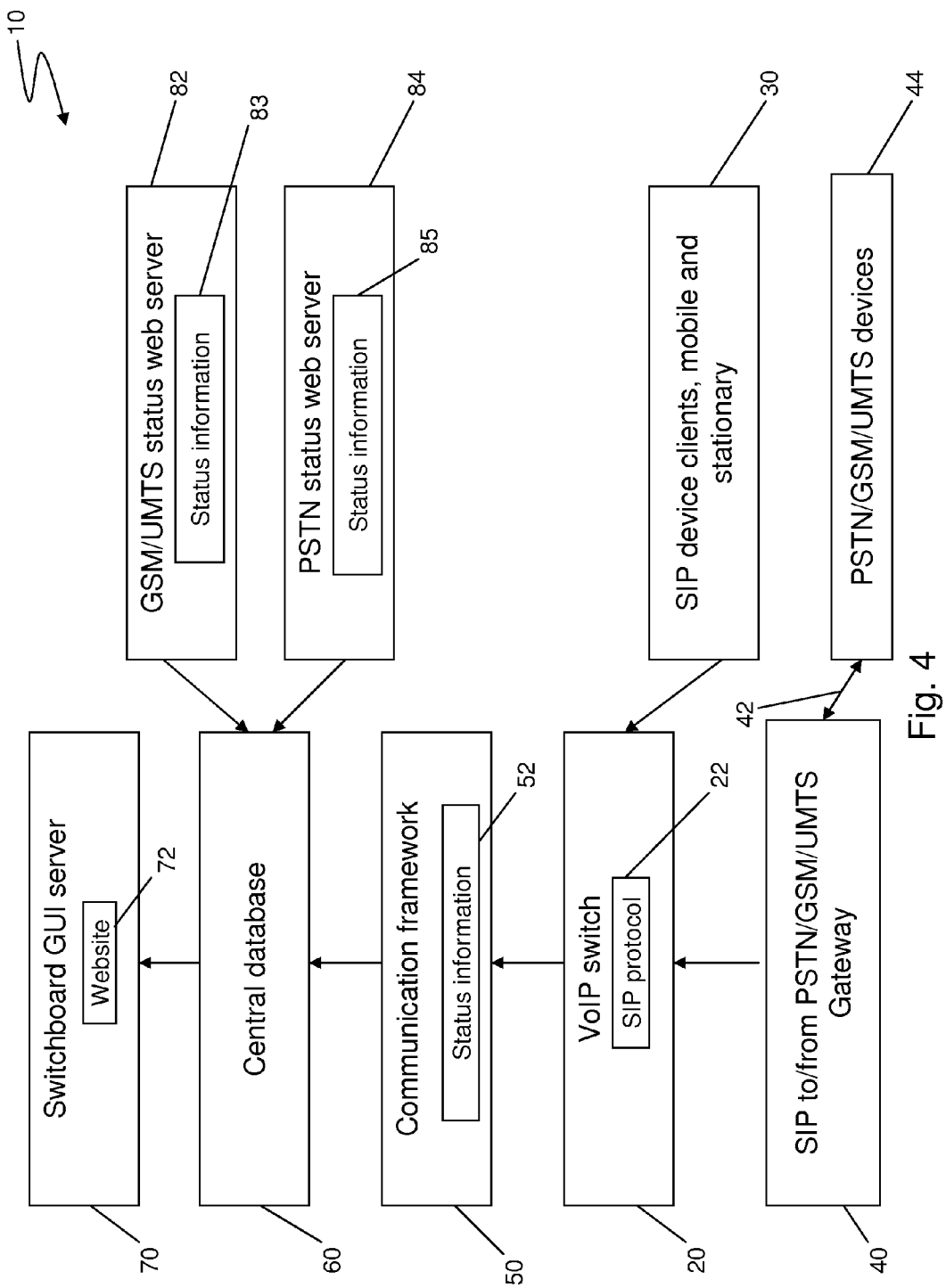
FIG. 4 is a data flow diagram of an embodiment unified multi-technology switchboard system.
Figure 5:
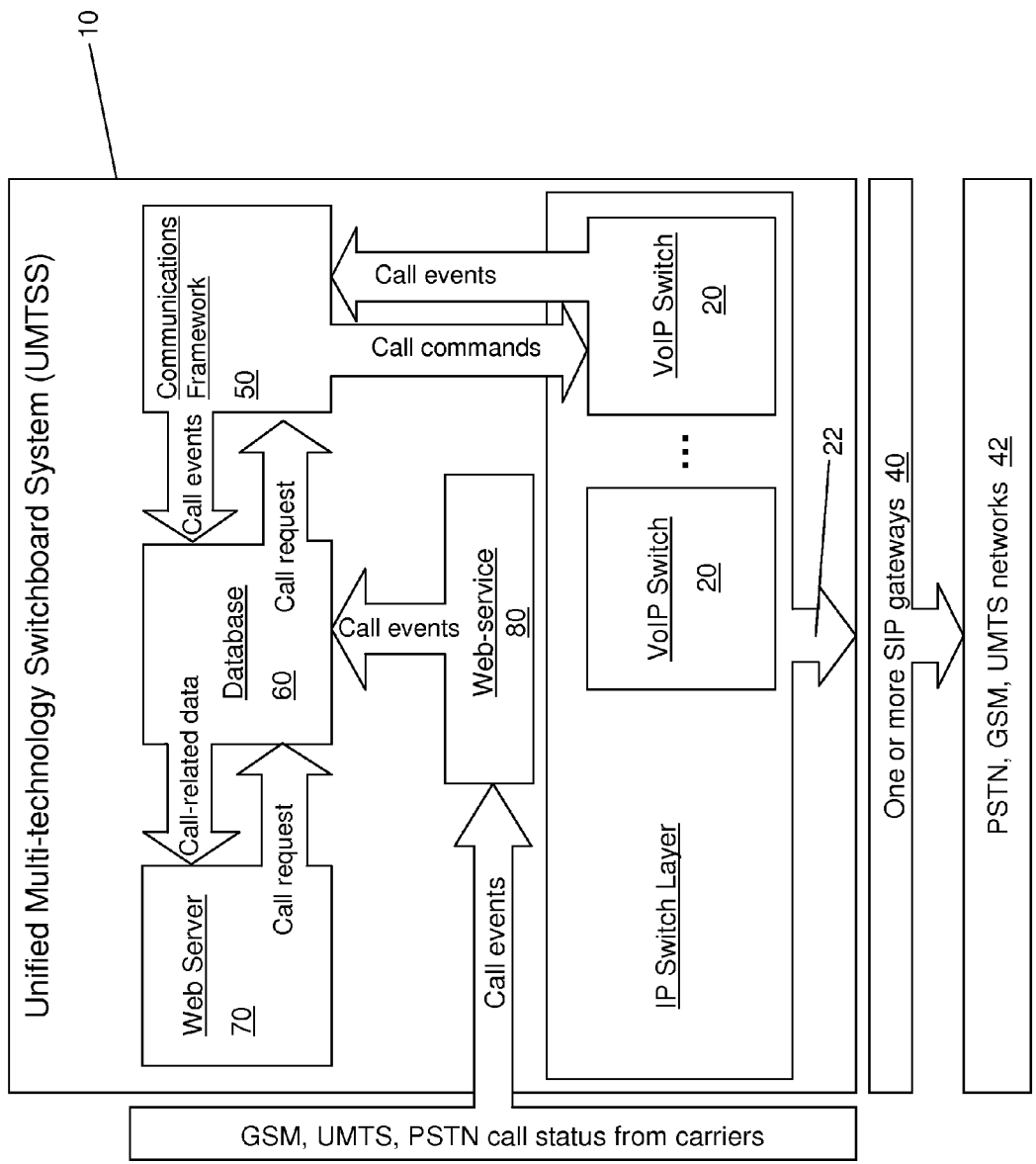
FIG. 5 is a functional block diagram of an embodiment multi-technology switchboard system and related environment.
Figure 6:
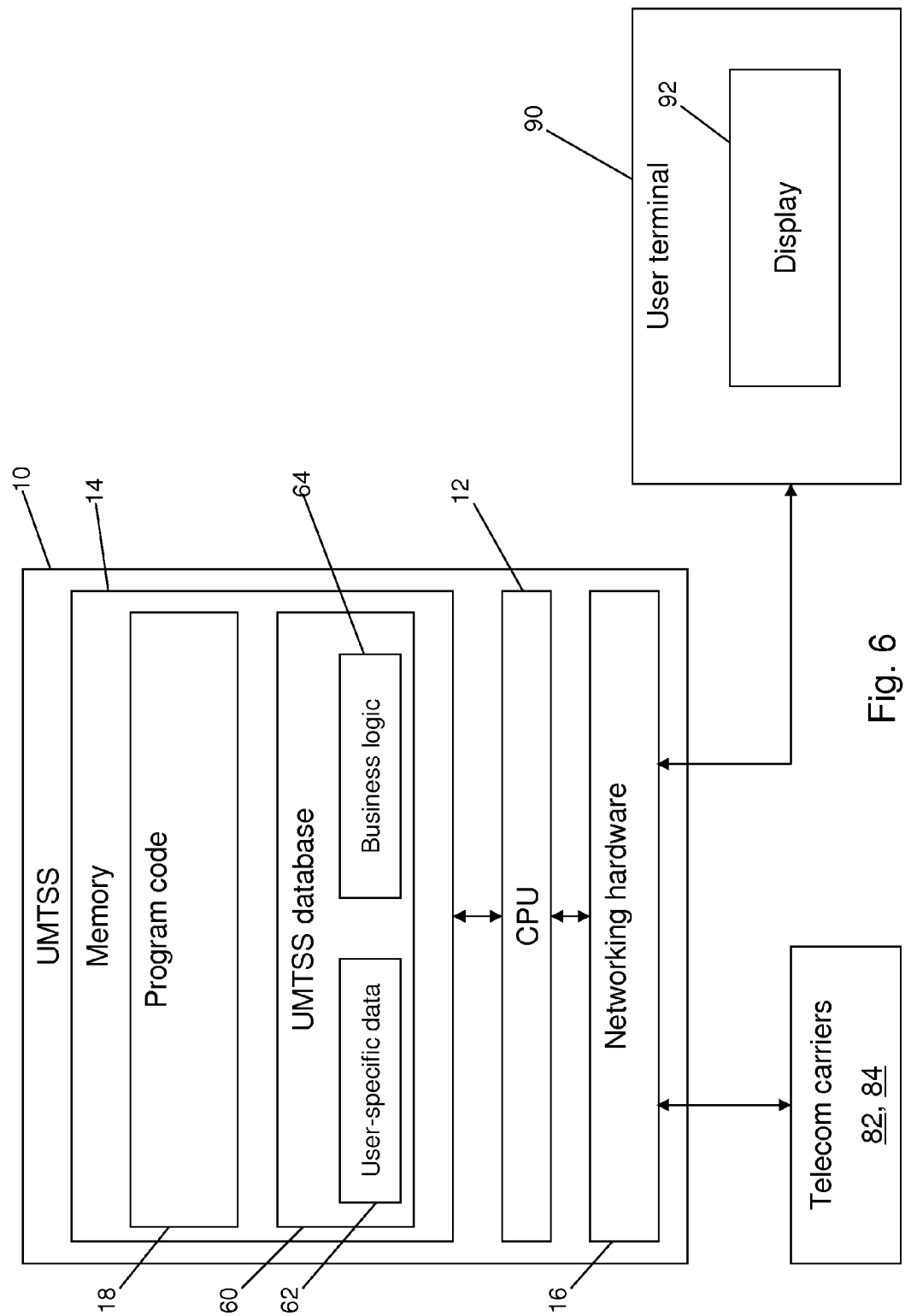
FIG. 6 is a block diagram of a computer system for an embodiment multi-technology switchboard system.

FIG. 4 shows data flow in an embodiment unified multi-technology switchboard system (UMTSS) 10. FIG. 5 is a functional block diagram of logic within the UMTSS 10. FIG. 6 is a functional block diagram of hardware elements of the embodiment UMTSS 10. The system 10 is able to provide a practical solution that solves an organization's need for real-time employee or user call status information from several different voice communications technologies and protocols.

Various embodiments of a UMTSS 10 may comprise several components that interact to form a multi-technology switchboard in which users can gain access to some or all call status information in real-time or near real-time through a simple Graphical User Interface (GUI), not withstanding whether or not the actual organization uses two or more different voice communications systems. The UMTSS 10 may be implemented with standard server equipment. As known in the art, an embodiment UMTSS may be implemented on a single server, or may be implemented by a plurality of servers working together using known networking techniques and protocols. By way of example, a single server system is shown in FIG. 6. The system 10 includes a central processing unit (CPU) 12 in communications with memory 14 and networking hardware 16. The memory 14 may include both volatile and non-volatile memory elements, as known in the art, and is typically provided by several separate memory elements, such as DRAM and magnetic memory, that are logically linked or grouped together using known software and hardware techniques. The networking hardware 16 is controllable, directly or indirectly as known in the art, by the CPU 12 to send data to remote systems or devices, and to received data from these remote systems or devices using known communications protocols, such as TCP/IP. Any suitable networking hardware 16 may be used. The memory 14 includes program code 18 that is executable by the CPU 12 to provide the functionality discussed in the following. Providing the program code 18 should be routine for one of ordinary skill in the art after having the benefits of the instant disclosure.

Input/output interfaces for the UMTSS 10 may be performed at the network level in the program code 18 using TCP/IP sockets that control data sent and received over the networking hardware 16 using well-known communications protocol standards. Certain preferred embodiment systems 10 include four software units in the program code 18 that interact to provide a multi-technology switchboard: a first server 70, which may be a web server, that provides a graphical user interface (GUI) on the display 92 of one or more users 90 of the system 10, including, for example, the interfaces shown in FIGS. 1-3; a database 60 provides an embodiment storage system, which may hold call-related data and data structures, such as business logic 64 and user information 62; a communications framework 50 that interfaces with a VoIP switch 20 and the database 60 to receive call information and cause execution of call commands, and which may also contain business logic; and finally a second server 80, which may run a web service, that receives call-related data from telecom carriers network services 82, 84, which may be via an HTTP protocol like SOAP, and stores this data in the database 60. Each of these components, and others, will be discussed in the following. The business logic may include logic specific to a particular customer or type of business. For example, the business logic may include information and logic related to time-out thresholds when ringing, if and when voicemail should be activated, and so forth. It will be appreciated that a user 90 may be one that uses the system 10 to control and direct calls (i.e., uses the system 10 as a switch board, as indicated by user terminal 90 in FIG. 6), and further includes telecommunications devices monitored, controlled or both by the system 10.

Embodiment switchboard systems 10 may include one or more VoIP switches 20, which may be software-based and thus provided by the program code 18. Each VoIP switch 20 is a software system for supporting VoIP calls and telephone services that can interact with Session Initiation Protocol (SIP) devices 30, SIP gateways 40 and other telecommunication networks. The VoIP switches 20 may all share a single server, each running in its own virtual server instance. Alternatively, each switch 20 may run on its own dedicated server, or may share a server with the other software components of the system 10. In short, any suitable hardware platform maybe used to implement the logical design, and not just the design indicated in FIG. 6.

To communicate with the software-based VoIP switches 20, the communications framework 50 may be used. The communications framework 50 may allow the software-based VoIP switches 20 to send events to the framework 50 for processing The framework 50 may also support sending commands to the VoIP switches 20. The communication framework 50 may be implemented as a service that listens to the IP software switches 20 for call and status events, using, for example, TCP/IP sockets, and then processes and stores these events in the database 60. In addition, the framework 50 may receive call requests from the database 60 (which may originate, for example, from the first server 70 in response to input from the GUI 92 on user terminal 90), and these call requests may then be propagated by the framework 50 in the form of corresponding call commands to the IP software switches 20 for execution by the IP switches 20. The communications framework 50 may run on standard server hardware.

As indicated, call events and call commands to and from the VoIP switches 20 generate call-related data that may be stored in the central database 60 for further processing, statistical purposes or customer billing. This central database 60 may be queried by a user 90 via the first server 70, which may be a web server, allowing access to real-time data from the internet or a corporate intranet, as well as access to conduct switchboard tasks such as call transfer, call hold, phone number directory searches, etc.

The web server application 70 may run on standard network server hardware and utilizes the networking hardware 16 to permit users 90 to use web browsers or the like to access a website 72 or the like, which is maintained by the server 70. The first server 70 is preferably a web server, as known in the art, that utilizes the HTTP protocol for communications with the user terminal to provide the GUI 92 via the website 72. Standard stored procedures may be used for the web server application 70 to query the database 60, and thus support, for example, directory or users searches and the like. As indicated, the server 70 may also present a GUI 92 that may enable users 90 to use the system 10 as a switchboard or to obtain call status information of various PSTN telephones, cell phones, or VoIP lines. This GUI 92 may be presented, for example, by way of a web application that creates the web site 72 which the user 90 may gain access to by logging into the server 70. To initiate calls, transfers, putting calls on hold (parking) and so forth, the user 90 of the web site 72 may click on the GUI 92 presented by the web site 72. The web site 72 web application running on the server 70 may then insert call-related data into the database 60 containing information about the desired call command (e.g., transfer call "A" to extension 305). Once the call command is in the database 60, a process running on the communication framework 50, which may be in a separate CPU 12 thread, may detect that a call command is waiting to be executed. The communications framework 50 may then propagate the call command to one or more of the IP switches 20, and once the IP switch or switches 20 have finished the call command the communications framework 50 may remove the call command from the database 60. It will be appreciated that the database 60 may be a single logical file in the memory 14, or may be dispersed throughout the memory 14 in several logical files, and may include a related database application program, as part of the program code 18, for reading data from and writing data to the database 60 as known in the art. The database application program may run on standard database server hardware.

As previously indicated, the server 70 may further present call-related data from the database 60, such as call status or call event information, by way of a website that employees 90 and users 90 of the unified switchboard system 10 can access through a login web page via, for instance, the internet, a LAN or a WAN. The web site 72 may be accessed from any computer or handheld device that supports a standard HTML web browser such as Mozilla, Internet Explorer, Opera, Safari, etc.

In order to communicate with VoIP terminal devices 30, the VoIP switches 20 may use the SIP protocol 22. The SIP protocol 22 allows SIP VoIP terminal devices 30 to send information to the VoIP switches 20 about their respective states. The state information may detail the network availability of the respective SIP terminal devices 30 or provide information about the calling status of the respective SIP devices 30, such as "ringing", "available", or "busy". As indicated, the switches 20 may then relay this information to the framework 50, which in turn can cause the information to be entered into the database 60. Changes in the database 60 may be detected by the server 70 by any suitable means, such as by monitoring the database or via inter-process signaling, and the server 70 can then update the website 72 or other GUI, such as a display connected to the system 10, accordingly.

The VoIP switches 20 may receive and send data to and from a PSTN network 42 via the SIP gateway 40 that can be located on the premises of a telephone carrier. The SIP gateway 40 permits calls to be made from a SIP VoIP terminal device 30 via the software-based VoIP switches 20 to a PSTN or GSM terminal device 44 (e.g. a telephone or cellular mobile telephone), as known in the art. The SIP gateway 40 also enables calls originating from PSTN, UMTS or GSM networks 42 (i.e., non-VoIP communications pathways) to reach a SIP terminal device 30 registered with a VoIP switch 20 in a standard manner.

All calls through a VoIP switch 20 may be monitored for status information 52 obtained via the communications framework 50. The status information 52 may be recorded in the database 60 and be reported in real-time or near real-time on the web site 72 of the switchboard web server 70 using, for example, standard HTML-based browsers and protocols.

The second server 80 is used to obtain call-related data for non-VoIP communications from call carriers of the non-VoIP communications. PSTN, UMTS or GSM call-related data 83, 85 is made available by the various respective operators of those systems through a network service 82, 84 accessible via the Internet or another network using, for example, the Simple Object Access Protocol (SOAP) protocol, or any other suitable protocol to carry the desired call-related information. The second server 80 on the system 10 may be used to access the status information 83, 85 via the network services 82, 84.

Once available, the second server 80 may cause the PSTN, UMTS or GSM status information 83, 85 (i.e, non-VoIP call-related data) to be immediately stored in the central database 60 and combined with or related to user-specific data 62, such as name, phone number, location and other related data obtained from the software-based VoIP switches 20 and registered SIP devices 30. Hence, call-related data that is specific to a user may be entered into, or associated with, the user-specific data 62 for that user. Data 62 in database 60 may thus be gathered and entered automatically from other electronic sources, such as the VoIP switches 20 or services 82, 84, and may also be entered manually via user interfaces, as known in the art, or be imported from other databases, as known in the art. In this manner, the central database 60 can hold the most up-to-date information about each user and his or her related telecommunications devices, and this information can be provided in real-time or near real-time to a user terminal 90, such as by way of the website 72, and may further be used to control and direct the VoIP switches 20 via the communications framework 50.

Information present in the central database 60 may be filtered, sorted, combined and grouped to provide the server 70 a complete and real-time or near real-time overview of the current calling status of all stationary and mobile SIP devices 30, as well as all PSTN phones and GSM/UMTS mobile cellular phones 44 with or without integrated SIP device clients. The information in the database 60 may also be used to support other services, such as directory lookups or other similar database queries. This information may be used to update the website 72 or other GUI as new information is made available, thereby keeping the website 72/GUI 92 as up-to-date as possible. Hence, the GUI 92, by way of website 72, may present call-related information in real-time (i.e., the user of GUI 92 notices no significant lag between when the status of a device changes and when the GUI 92 presents that status change), or near real-time (i.e., a reporting lag may be noticeable but is not so severe that the presented information is contextually irrelevant for the purposes of the GUI 92).

If a company or other user would like to use an existing legacy PABX system in conjunction with an embodiment UMTSS 10, calls may be routed from the legacy PABX to the UMTSS 10 via, for example, a PSTN-to-SIP gateway 40 or a hardware interface between ISDN and SIP. Incoming calls may go through the UMTSS 10 and the UMTSS 10 may then route selected calls back to a PSTN number that terminates at the legacy PABX. However, other embodiments simply employ the UMTSS 10 as an IP-PABX using the integrated IP-software switches 20 without any legacy PABX.

Embodiment systems 10 may provide a total web-based system that does not require the installation of any software applications or hardware devices at the various customers' computers or locations. For example, an embodiment UMTSS 10 may run on the system of a service provider, and the customers may access the switchboard 72 by using a standard web browser. Hence, the switchboard 72 may be accessed from any device connected to the internet. Logically, the UMTSS 10 might be seen as both the logic/business and data tier of a traditional 3-tier architecture, whereas the user client (Web Browser, SIP User Agent etc.) represents the presentation layer. The database 60 may hold relational data to identify, authenticate and/or authorize clients whether they connect locally or remotely (i.e., through the Internet). Browsers sessions may be bound to the identified user's telecommunications devices and, vice versa, SIP UA sessions may be bound to their users.

In other embodiment, the switchboard system may simply provide monitoring of mobile telecommunications devices, such as mobile phones on GSM and UMTS networks. Such an embodiment cellular mobile switchboard system (CMSS) may conceptually be thought of as a subset of the UMTSS 10. An embodiment cellular mobile switchboard system (CMSS) is capable of simultaneously interacting with different available cellular mobile telephone communications systems such as GSM telecommunications networks, UMTS telecommunications networks, etc., to provide switchboard operator(s) and other users with relevant information for mobile devices. The CMSS may provide a practical solution that solves an organization's need for real-time employee, user call status information, or both from one or several different cellular mobile telephone communications systems.

A graphical user interface presented by an embodiment CMSS may be similar to those shown in FIGS. 1A and 3. In FIG. 3, the switchboard system presents a simple user interface that shows employees 97 and 97 engaged in GSM calls.

Figure 7:
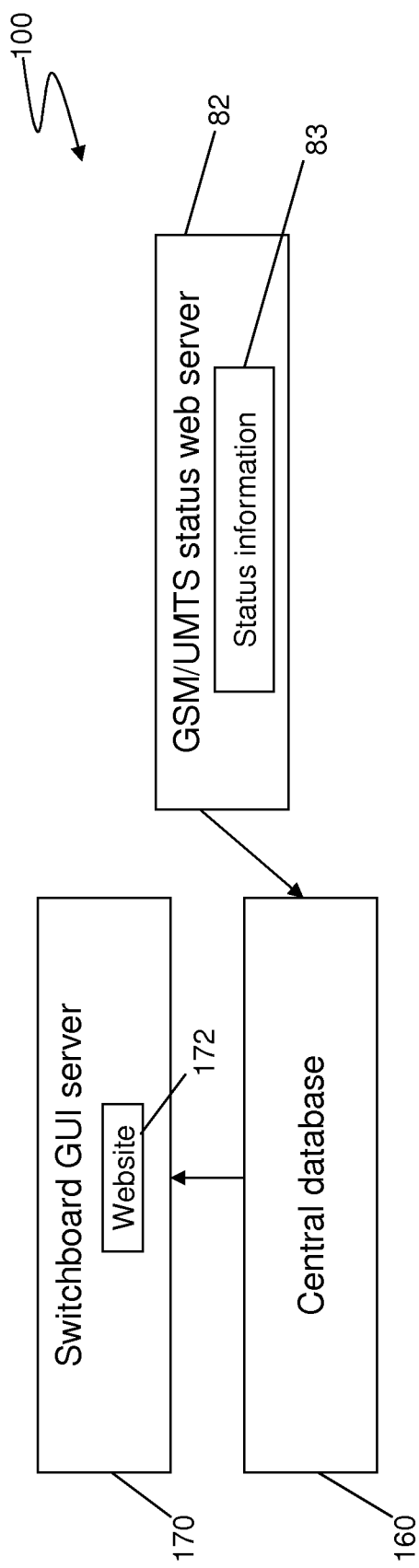
FIG. 7 is a data flow diagram of another embodiment switchboard system.
Figure 8:
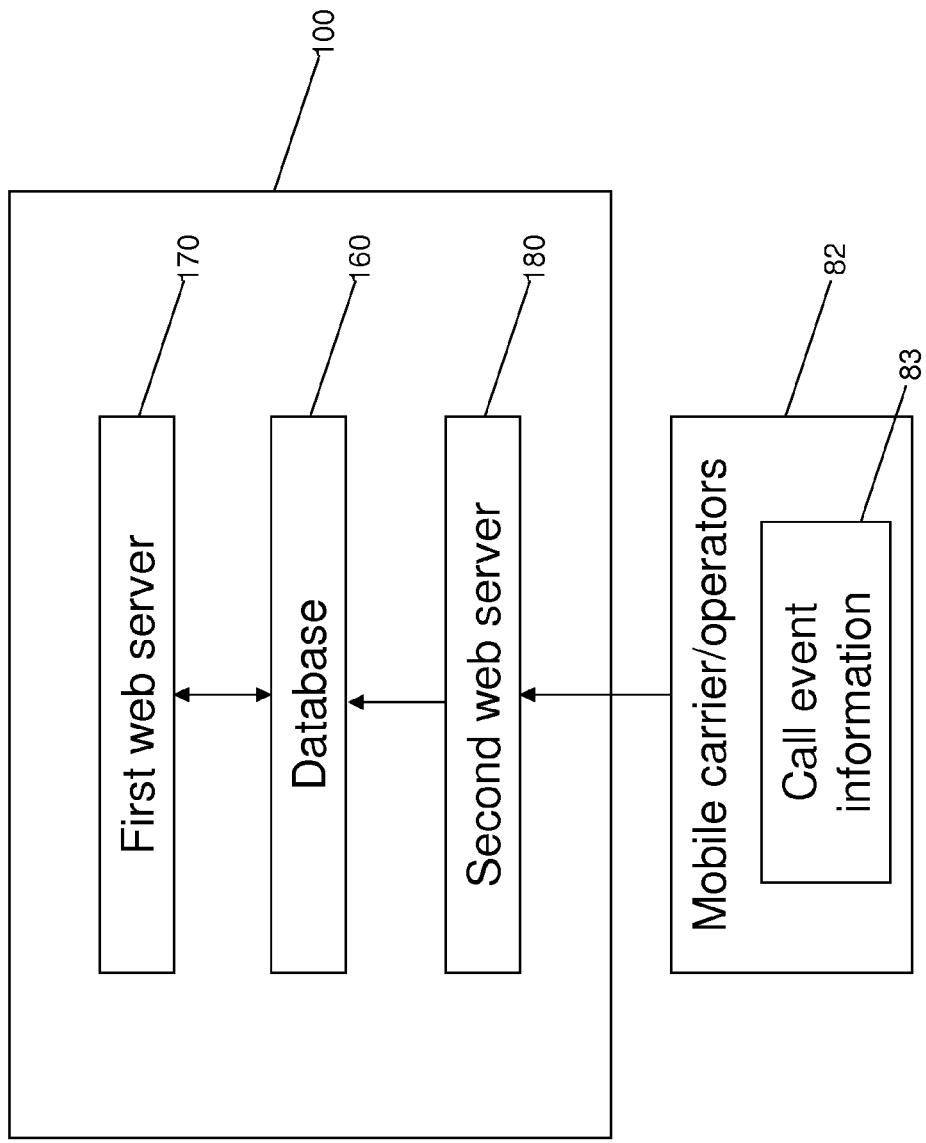
FIG. 8 is a block diagram of the system indicated in FIG. 7.

FIG. 7 shows data flow in an embodiment unified CMSS 100. The hardware to support the CMSS 100 may be similar to that shown and discussed in reference to FIG. 6. FIG. 8 is a functional block diagram of the system 100. The system 100 is able to provide real-time employee or user call status information from one or several different cellular mobile telephone communications systems 82.

As indicated earlier, the CMSS 100 may be implemented with standard server equipment. Hence, the CMSS 100 may be implemented on a single server, or may be implemented by a plurality of servers working together. Input/output interfaces for the CMSS 100 may be performed on the network level in software using TCP/IP sockets. In certain preferred embodiments, the system 100 includes three software units that interact to provide a cellular switchboard: a first server 170, which may be a web server, that provides a GUI to one or more users of the system 100, including, for example, the interfaces shown in FIGS. 1A and 3; a storage system implemented by a database 160 that holds call-related data and data structures, as well as user-specific information; and finally a second server 180, which may run a web service, that may receive data from the various cellular mobile technology carriers 82, which may be via an HTTP protocol like SOAP, and stores this call-related 83 in the database 160. Each of these components, and others, will be discussed in the following.

The cellular mobile telephone communications system (i.e, UMTS or GSM) status information 83 may be made available by the various respective operators 82 of those systems through a respective web service 82 accessible via the Internet using, for example, the SOAP protocol. The second server 180 on the CMSS system 100 may be used to access the status information 83 from the respective mobile service carrier or operator 82.

Once available, the second server 180 may cause the UMTS or GSM call-related data 83 to be immediately stored in the central database 160 and combined with user-specific data, such as name, phone number, location and other related data. This data can be entered into the database 160 manually though the user interface, or be imported from other databases as known in the art. Hence, like the database 60, the database 160 may be a relational database that is used to store and related call-related data with user-specific data, and which may be queried and so forth in a known manner to develop useful information. However, it will be appreciated that simpler storage systems other than databases 60, 160 may be used for the transfer of call-related data from the second server 180 to the first server 170.

Beneficially, with respect to relational databases as used in the embodiment CMSS 100, information present in the central database 160 may be filtered, sorted, combined and grouped to provide the server 170 a complete and real-time or near real-time overview of the current calling status of all GSM or UMTS mobile cellular phones together with user-specific information and even call statistics, billing statistics or the like. This information may be used to update the website 172 or other GUI as new information is made available, thereby keeping the website 172/GUI as up-to-date as possible. As previously indicated, standard stored procedures may be used for the web server application 170 to query the database 160.

The GUI presented on an end-user terminal may be provided, for example, by way of a web application that creates a web site 172 which the user may gain access to by logging into the server 170. All mobile calls can be monitored for status information, incoming caller ID, etc. and be reported in real-time or near real-time on the web site 172 of the switchboard using standard HTML-based browsers. Employees and users of the system 100 can access the website 172 through a login web page. The web site 172 may be accessed from any computer or handheld device that supports a standard HTML web browser, such as Mozilla, Internet Explorer, Opera, Safari, etc.

Hence, embodiment systems 100, as with the system 10, may provide a total web-based system that does not require the installation of any software applications or hardware devices at the various customers' computers or locations. For example, an embodiment CMSS 100 may run on the system of a service provider, and the customers may access the switchboard 172 by using a standard web browser. Hence, the switchboard 172 may be accessed from any device connected to the Internet.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

What is claimed is:

1. A telecommunications device comprising:
   networking hardware adapted to provide data communications over a network;
   a first server that utilizes the networking hardware to provide a user interface to a user terminal connected to the network;

at least a Voice over Internet Protocol (VoIP) switch adapted to utilize the networking hardware to support a VoIP call over the network in response to call requests originating from the first server;

a storage system including a database containing user-specific data for a plurality of users and a database application program, said storage system adapted to receive first call-related data from the VoIP switch, provide corresponding first call-related data to the first server, and associate in the database first call-related data of a user with corresponding user-specific data for that user; and a second server that utilizes the networking hardware to obtain second call-related data from a carrier of non-VoIP calls and provide corresponding call-related data to the storage system; and wherein the user interface is adapted to present on the user terminal at least a portion of the user-specific data and at least a portion of each of the corresponding first and second call-related data.

2. The device of claim 1 further comprising a communications framework adapted to interface the storage system with the at least one VoIP switch, wherein the communications framework obtains call requests from the first server and submits corresponding call commands to the VoIP switch.

3. The device of claim 2 wherein the call requests originate from the first server and are stored in the storage system.

4. The device of claim 1 wherein the first server is a web server, and the user interface is a graphical user interface provided by a webpage maintained by the web server.

5. The device of claim 1 wherein the second server is a web-service application adapted to communicatively interface with a server of the carrier.

6. The device of claim 5 wherein the second server employs the Simple Object Access Protocol (SOAP) protocol to communicatively interface with the server of the carrier.

7. The device of claim 6 wherein the carrier is at least one of a GSM, UMTS or PSTN communications network.

8. The device of anyone of claim 1 further comprising:
at least a central processing unit (CPU) capable of controlling the networking hardware; and
memory comprising program code executable CPU to provide the first server, the second server, and the at least a VoIP switch.

9. A telecommunications device comprising:
networking hardware adapted to provide data communications over a network;
a first server that utilizes the networking hardware to provide a user interface to a user terminal connected to the network;
at least a Voice over Internet Protocol (VoIP) switch adapted to utilize the networking hardware to support a VoIP call over the network in response to call requests originating from the first server, said VoIP switch generating first call related data;
a second server that utilizes the networking hardware to obtain second call-related data from at least a telecommunications carrier of mobile devices;
a storage system including a database containing user-specific data for a plurality of users and a database application program, said storage system adapted to receive said first call-related data from the VoIP switch, receive said second call-related data from the second server, provide corresponding first and second call-related data to the first server, and to associate in the database the first and second call-related data of a user with corresponding user-specific data for that user; and
wherein the user interface is adapted to present on the user terminal at least a portion of the user-specific data and at least a portion of the corresponding first and second call-related data, including call related data derived from the VoIP switch and call-related data derived from the telecommunications carrier of mobile devices.

10. The telecommunications device of claim 9, wherein the telecommunications carrier is a cellular network carrier.

* * * * *